Dec. 8, 1970 N. D. LEVIN ET AL 3,545,838
TEMPERATURE COMPENSATED COLLIMATOR HOLDER ASSEMBLY
Filed March 28, 1966 2 Sheets-Sheet 2

INVENTORS.
Nathan D. Levin
Angelos A. Potakis

ATTY.

United States Patent Office 3,545,838
Patented Dec. 8, 1970

3,545,838
TEMPERATURE COMPENSATED COLLIMATOR HOLDER ASSEMBLY
Nathan D. Levin, Highland Park, and Angelos A. Potakis, Chicago, Ill., assignors to Admiral Corporation, Chicago, Ill., a corporation of Delaware
Filed Mar. 28, 1966, Ser. No. 538,054
Int. Cl. G02b 5/14
U.S. Cl. 350—96
10 Claims

ABSTRACT OF THE DISCLOSURE

A holder assembly securing a generally bullet shaped light collimator to permit slight movements of supporting points in response to temperature variation. A C ring encircles the collimator body near its base and rests in a tapered opening in the holder which is larger than the base. The C ring supports the collimator without shadowing its base and moves relative to the holder to compensate for temperature variation.

---

This invention relates in general to the manufacture of color-kinescopes and in particular to light collimators used to simulate a point light source for exposing light sensitive phosphors deposited on face plates of color picture tubes. More particularly, this invention is concerned with means for accurately positioning and securely supporting a light collimator in a lighthouse such that maximum light flux is transmitted by the collimator, while the possibility of damage thereto is minimized.

In the manufacture of color television picture tubes, a lighthouse is used to expose photo-sensitive phosphors deposited on the picture tube face plate. The face plate is normally mounted on the lighthouse in the path of light rays from a simulated point light source located where the electron beam would normally emerge. The point light source conventionally comprises a non-polished tip of a light conducting collimator, held in a precise horizontal and vertical position by a collimator holding assembly. A powerful ultraviolet light bulb, in combination with a concentrating reflector placed adjacent the end of the collimator opposite the non-polished tip, supplies high intensity ultraviolet light to the collimator.

Many light collimators used in the manufacture of color television picture tubes are bullet shaped and include a frustum light base having a generally flat light collecting surface. These collimators are typically supported at the light collecting surface by allowing them to rest directly on a support plate having a hole therethrough of diameter slightly smaller than the collecting surface. Light flux from the bulb is admitted through the hole and transmitted through the collimator. While from a physical standpoint this arrangement adequately supported the collimator, the doughnut shaped area formed by the light collecting surface overlapping the hole, prevented a substantial quantity of light from entering the collimator proper, and thus reduced the maximum possible light output from the non-polished tip. The reduced light output in turn required a longer phosphor exposure time, thereby adding to the cost and time of manufacture.

To obviate this light reduction, the preferred form of the invention utilizes a C shaped wire clip having a circular cross section, to support the collimator base on the support plate. The wire clip supports the collimator by engaging the sides of the base, thereby providing a shadow-free, unobstructed area adjacent the light collecting surface.

Several additional advantages are realized by supporting the collimator base in this manner. First, the wire clip engages the side of the base in a line contact, thus minimizing light absorption through the collimator sides. Second, the wire ring may be designed to co-operate with a slightly modified support plate to assist centering the collimator base with respect to its top support. Finally, the wire clip provides a safer collimator support by substantially eliminating the likelihood of fracturing a collimator due to extreme temperature variations.

Occasionally during the operation of a lighthouse, an ultraviolet light bulb will explode due to its extremely high internal pressure. Since the light bulb is located adjacent the light collecting surface, an explosion tends to drive the collimator against an apertured upper support plate, damaging the light emitting tip. To prevent such damage, it was conventional to provide a shoulder contiguous with the collimator tip, to serve as a bearing surface against the upper support plate. Unfortunately, the shoulder also reduced the quantity of light emitted from the tip, under some circumstances by as much as 30%.

The collimator support assembly disclosed in this invention eliminates the light reducing shoulder while resiliently supporting the collimator adjacent its non-polished tip, thereby aiding in preventing damage to the collimator from the explosion of a light bulb.

Accordingly, it is the primary object of this invention to provide means for supporting a light collimator without obstructing the light flux available to the light collecting surface.

Another object of this invention is to provide support means which do not obstruct the light flux available to the light collecting surface of a collimator, while securely supporting the collimator in a manner such that the possibility of damage thereto is minimized.

An additional object of this invention is to provide means for supporting a frustum shaped base of a collimator at its tapered sides, while minimizing surface contact therewith and preventing damage incident to extreme temperature variations.

Another object of this invention is to provide means for supporting a collimator adjacent its light emitting tip, without restricting the maximum available light.

It is also an object of this invention to support a light collimator adjacent its light emitting tip without restricting the maximum available light, wherein the support prevents damage to the collimator incident to abnormal shock.

A feature of this invention resides in the use of a C shaped resilient ring fabricated of wire, at least partially surrounding the collimator base and supporting it with minimum surface contact.

An additional feature of this invention resides in the provision of an inwardly tapered support structure co-acting with a C shaped ring for centering the base of a collimator.

A further feature of this invention resides in the use of a resilient metal element supporting the collimator adjacent its light emitting tip for absorbing shock transmitted thereto incident to shattering of a light source adjacent the collimator base.

The primary advantage of this invention is its economical support mechanism which provides a firm and safe collimator support while allowing maximum light input to the light collecting end and maximum light output from the light emitting tip, thereby reducing phosphor exposure time during the manufacture of color television picture tubes.

Other objects and advantages of this invention will become apparent upon an examination of the following description taken in conjunction with the accompanying drawings wherein.

Figure 1:
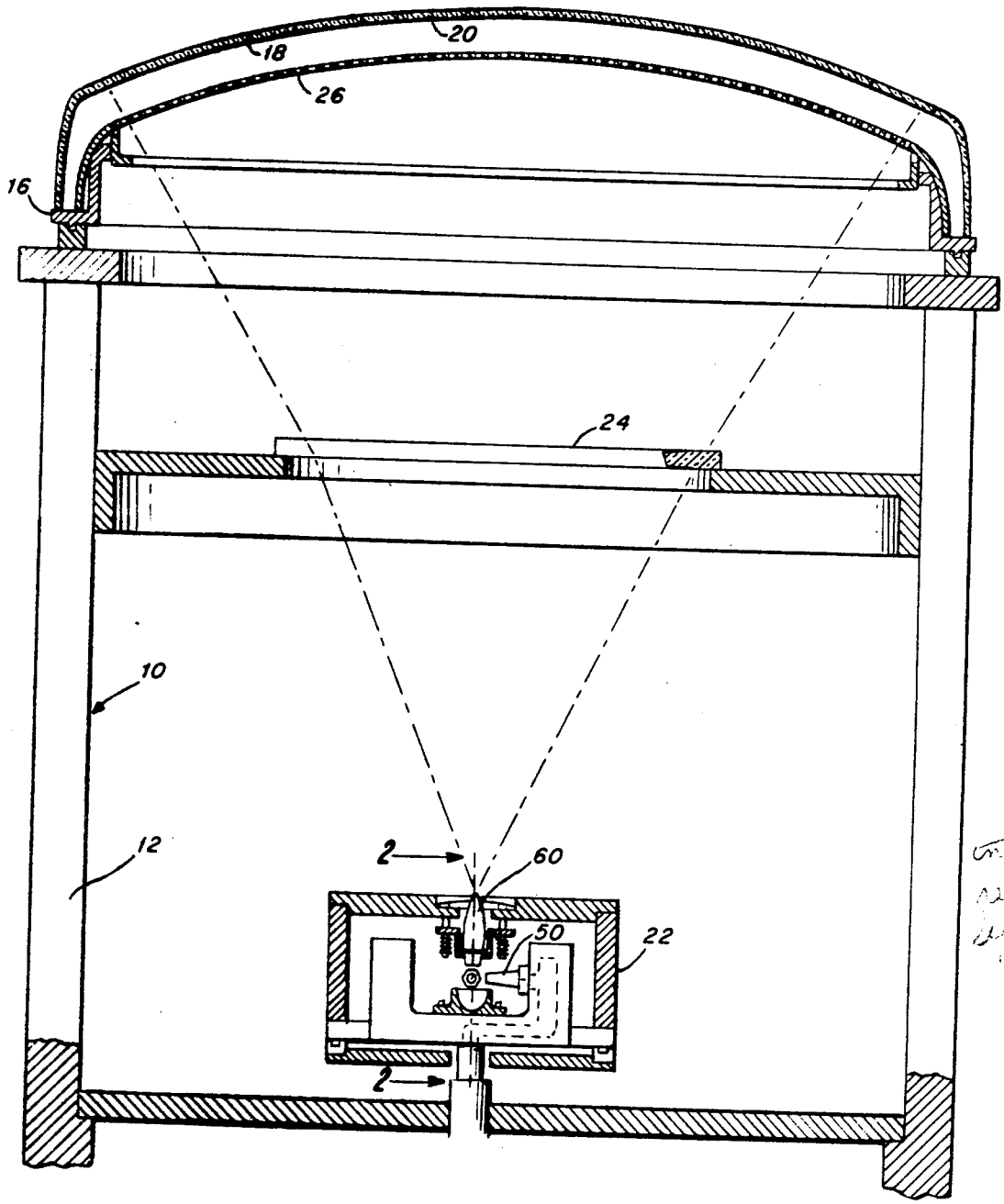
FIG. 1 is an elevation view, partly in section, of a lighthouse including a light collimater supported in accordance with the invention.

Turning to consideration of the drawings and in particular to FIG. 1, there is shown a lighthouse of the type commonly used in the manufacture of color television picture tubes, and is generally referred to by reference numeral 10. The lighthouse essentially comprises an enclosure 12 supporting an aligning structure 16 which aligns a picture tube face plate 18 during exposure of a light sesnsitive phosphor coating 20 deposited on the inner surface thereof. The phosphor is exposed by light flux emanating from a light box 22, subsequent to modification of the light flux path by a lens 24. A foraminated mask 26 adjacent the face plate shadows the light flux to produce a mosaic pattern as is well known in the art. The method of exposing three different phosphors to obtain a triad mosaic pattern is also well known in the art and need not be elaborated upon.

Figure 2:
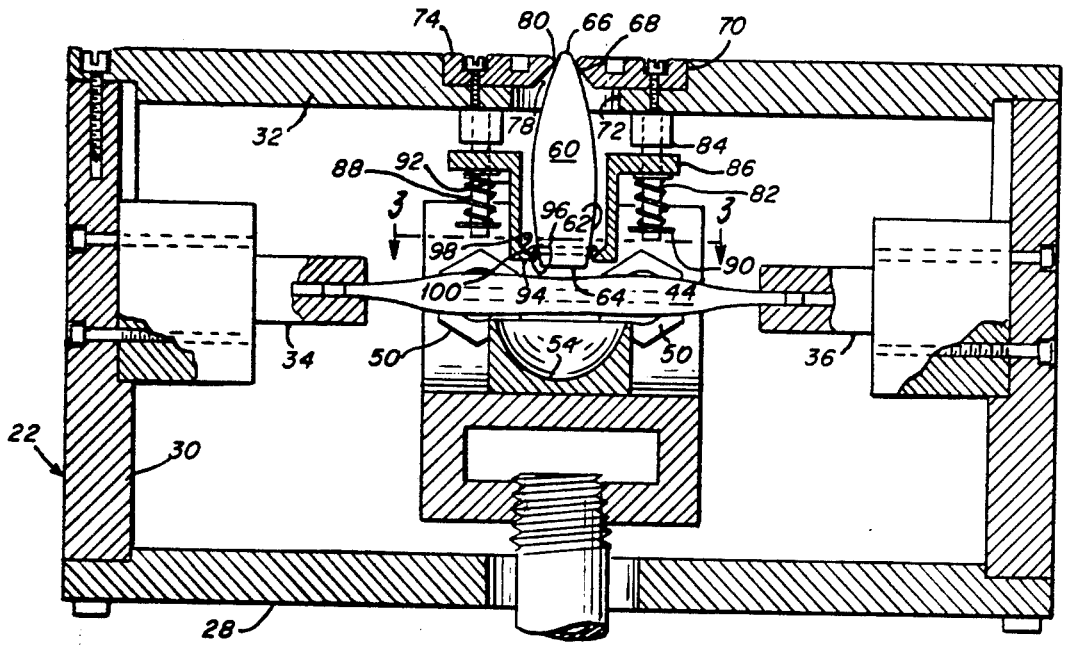
FIG. 2 is an enlarged, partially sectioned elevation view taken along line 2—2 of the lighthous shown in FIG. 1, illustrating the collimator, its light source, and its base and tip supports.

Referring to FIG. 2, light box 22 is of generally circular shape and includes a bottom 28 adequately secured to a cylindrical wall 30 which in turn supports a top 32. A pair of oppositely disposed lamp holders 34 and 36 are secured to wall 30 and support an ultraviolet lamp 44, such as a General Electric Company one kilowatt high pressure mercury arc lamp, type BH6. This lamp constitutes the sole source of ultraviolet light required to expose the light sensitized phosphor emulsion.

Ultraviolet lamp 44 is cooled by compressed air directed at its electrodes by a plurality of air jets 50, best seen in FIG. 1. The ultraviolet rays are concentrated and directed upwardly by a reflector 54 positioned adjacent and below the lamp.

A generally bullet shaped light collimator 60 includes a frustum shaped base portion 62, which comprises that portion of the collimator below its middle, a polished light collecting surface 64 at its lower end, and a light emitting tip 66 at its upper terminus. In the preferred embodiment, there is a smooth transitional section 68 between the collimator body and the light emitting tip. Collimator 60 is preferably made of quartz, but may also be of glass.

Top 32 is provided with a depressed circular area 70 at its center and a hole 72 therethrough communicating with the interior of the light box. An insert 74 in the depressed circular area includes an aperture 78 having a narrow edge 80 supporting the upper portion of the collimator at its smooth transitional section.

Three depending studs 82 (one stud not shown) secured to the underside of top 32 are triangularly spaced about hole 72. Each stud is provided with a shoulder 84 to limit upward movement of a collar 86 movably secured thereon. Coil springs 88, anchored by clips 90, bias the collar toward top 32. Collar 86 includes a downwardly extending cylindrical portion 92 terminating in a bottom 94 having a circular opening 96 therethrough, coaxial with hole 72 and aperture 78. The periphery of opening 96 is chamfered at 98 from its top towards its bottom.

A C-shaped resilient ring 100, is typically fabricated of stock having a circular cross section, such as wire, although a ring stamped of sheet metal stock may also be used. The ring has an outer diameter sufficient to be supported by the chamfered edge, and an inner diameter slightly larger than the diameter of the collimator adjacent the flat light collecting surface. When the light box is assembled, the ring is slipped over the collimator bottom, and held in place by friction. The collimator and ring are then placed in the light box from the top, by removing insert 74 and are supported by the ring cooperating with the chamfered edge.

The ring supports the collimator around the periphery of its base, thus preventing obstruction of light entering the flat light collecting surface. The ring also supports the collimator in a line surface contact, thereby minimizing light absorption from the collimator which would reduce the amount of light flux reaching the emitting tip.

Figure 3:
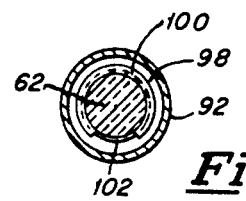
FIG. 3 is a slightly enlarged plan view taken along line 3—3 of FIG. 2 illustrating, in detail, the support structure of the collimator base.

FIG. 3 more clearly shows the C ring supporting the collimator around the periphery of the base with minimal contact area. The ring in turn is supported by chamfer 98 and provides a clearance space 102 between the collimator base, and bottom 94.

This combination of elements provides numerous advantages, some of which may not be readily obvious. For example, assume the collimator is merely supported in a circular opening. During assembly, the collimator will naturally be forced into supporting contact with the base. Assume now that the lighthouse has been in operation for some time, and the temperature of the collimator and support plate have increased. Due to the extremely small thermal coefficient of expansion of the collimator quartz or glass, and the relatively large coefficient of expansion of the support material (typically metal), the support plate will have moved up under the urging of the springs and now support the collimator at a larger diameter.

When operation of the lighthouse is terminated, either between exposures of the face plate, or at the end of a day, the temperature of the support plate would decrease and it would contract, possibly fracturing the collimator. This invention greatly minimized the possibility of fracturing the collimator since the C ring supports the collimator out of contract with the support plate and is substantially unaffected by temperature changes. The clearance space is provided to allow small unrestricted movement of the collimator.

There is also an advantage in providing chamfer 98 at bottom 94. This configuration is extremely helpful to assist centering the collimator base within circular opening 96, and in alignment with aperture 78.

Figure 5:
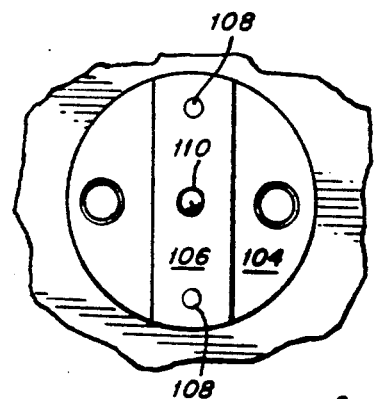
FIG. 5 is a plan view of the alternate embodiment, taken along line 5—5 of FIG. 4.
Figure 4:
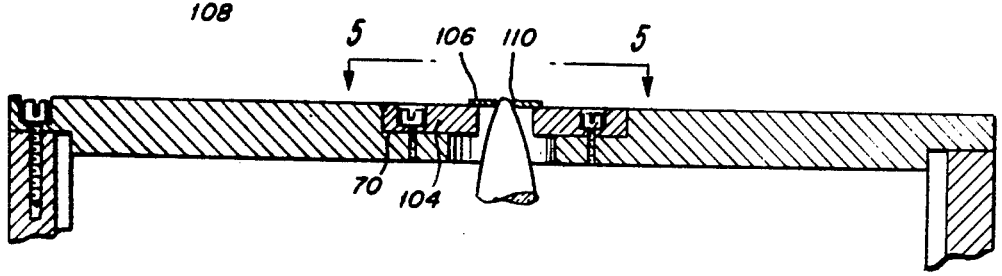
FIG. 4 is a partially sectioned elevation view of an alternate embodiment of the collimator tip support shown in FIG. 2.

Referring now to FIGS. 4 and 5, an alternate embodiment is illustrated for supporting the collimator at its smooth transitional section, rather than the narrow edge 80 illustrated in FIG. 2. An insert 104 is used within depressed circular area 70, and a thin strip of beryllium copper 106 having non-rigid, resilient properties, is secured to the upper side thereof with screws 108. The thin spring strip includes an aperture 110 coaxial with opening 96, the edges of which support the collimator at its smooth transitional section. The strip 106 has sufficient spring to cushion the collimator, should it be forced upwardly by a fortuitous explosion of lamp 44. This cushioning is extremely helpful to prevent fracture of the collimator tip.

What has been described is a collimator support assembly which neither obstructs or inhibits the quantity of light admitted to and transmitted by a light collimator while securely supporting the collimator tip to eliminate the possibility of damage thereto.

The embodiments of the invention in which an exclusive property or privilege is claimed are defined as follows:

1. In combination with a light collimator having a body of generally bullet shape, a light emitting end, and a longitudinally tapered light collecting end terminating in a light collecting surface: first and second support means biased toward each other and supporting said collimator at said emitting and collecting ends respectively; said second support means including a plate and a resilient ring, movably supported by said plate, at least partially encircling said light collecting end; said collimator and said plate having differing thermal coefficients of expansion, whereby said resilient ring compensates for temperature induced physical variations between said collimator and said plate.

2. The combination as set forth in claim 1 wherein said plate defines an opening therethrough having an area larger than said light collecting end; said resilient ring supporting said collimator in spaced relation to said opening.

3. The combination as set forth in claim 2 wherein said first support means defines an aperture therethrough co-axial with said opening, for receipt of said light emitting end; said opening having a shape similar to said light collecting end, and an inwardly sloped edge portion co-acting with said ring to assist centering said collimator.

4. The combination as set forth in claim 3 including additionally: a light source adjacent said light collecting end for supplying light flux to the collimator; and wherein said resilient ring is of C shape for securely embracing said light collecting end and providing maximum centered support therefor with minimal surface contact, thereby minimizing light flux absorption therefrom.

5. The combination as set forth in claim 1 wherein said plate defines an opening sufficient to admit said light collecting end, and said resilient ring supports said collimator in spatial relation thereto; and wherein said first support means includes an element defining an aperture having a narrow rim supporting said collimator adjacent said light emitting end for minimal contact therewith, thereby minimizing loss of light flux transmitted by said collimator.

6. The combination as set forth in claim 5 wherein said collimator is characterized by a smooth transitional section between said light emitting end and said body; and wherein said element is non-rigid and supports said collimator at said smooth transitional section, whereby said collimator is protected from damage incident to fortuitous shattering of a light source adjacent thereto.

7. The combination as set forth in claim 6 wherein said non-rigid element comprises a strip of resilient spring metal which cushions said collimator upon shattering of a light source adjacent thereto.

8. The combination as set forth in claim 1 wherein said light collimator is characterized by a smooth transitional section between said light emitting end and said body; said first support means defining an aperture supporting said collimator at said transitional section, and making minimal contact therewith; and wherein said plate defines an opening co-axial with said aperture for receipt of said light collecting end, said opening including a sloped edge portion co-acting with said resilient ring to assist centering said collimator.

9. The combination as set forth in claim 8 wherein said resilient ring is of C shape and circular cross section and securely grips the light collecting end of said collimator, and wherein said first support means includes a resilient spring supporting said collimator at said smooth transitional section with minimum light flux absorption therefrom, said resilient spring also protecting said collimator from damage incident to fortuitous shattering of a light source adjacent said light collecting end.

10. In combination with a light collimator having a body of generally longitudinal shape, a light collecting end of longitudinally tapering cross section terminating in a light collecting surface, and a light emitting end; first support means defining an aperture receiving and positioning said light emitting end; second support means supporting said light collimator at said light collecting end in substantially noninterfering attitude with said light collecting surface, said second support means including a wire partially encircling said collimator at said light collecting end and providing minimal surface contact therewith; a light source adjacent said light collecting surface supplying light flux to said collimator; and means biasing said first and second support means toward each other whereby said light emitting end is firmly retained within said aperture and said second support means absorbs a minimum amount of the light flux in said collimator.

References Cited
UNITED STATES PATENTS

| | | | |
|---|---|---|---|
| 1,875,048 | 8/1932 | Levene | 350—96UX |
| 2,740,318 | 4/1956 | Sharp | 350—96 |
| 2,942,099 | 6/1960 | Goldstein | 350—96X |

JOHN K. CORBIN, Primary Examiner

U.S. Cl. X.R.

95—1